United States Patent [19]

Fröb

[11] 4,171,410

[45] Oct. 16, 1979

[54] ELASTIC BODY AND METHOD OF MAKING SAME

[75] Inventor: Gerd Fröb, Ulm, Fed. Rep. of Germany

[73] Assignee: Mayser-GmbH & Co., Ulm, Fed. Rep. of Germany

[21] Appl. No.: 920,272

[22] Filed: Jun. 29, 1978

[30] Foreign Application Priority Data

Jul. 1, 1977 [DE] Fed. Rep. of Germany ....... 2729738

[51] Int. Cl.² ............................................. B32B 3/26
[52] U.S. Cl. ...................... 521/52; 264/321; 427/181; 427/182; 427/244; 428/311; 428/327; 428/328; 521/53; 521/55
[58] Field of Search ............... 427/181, 182, 185, 244; 521/52, 53, 55; 428/304, 306, 309, 311, 313, 315, 327, 328, 329, 330, 922; 264/321

[56] References Cited

U.S. PATENT DOCUMENTS

| | | | |
|---|---|---|---|
| 3,171,820 | 3/1965 | Volz | 264/321 |
| 3,269,887 | 8/1966 | Windecker | 427/244 |
| 3,325,338 | 6/1967 | Geen | 427/244 |
| 3,353,994 | 11/1967 | Welsh et al. | 521/55 |
| 3,661,630 | 5/1972 | Remmert | 427/244 |
| 3,667,173 | 7/1972 | Adams | 427/244 |

*Primary Examiner*—William J. Van Balen
*Attorney, Agent, or Firm*—Karl F. Ross

[57] ABSTRACT

An open-cell synthetic-resin foam body is placed in a fluidized bed of conductive metallic particles having a particle size many times smaller than the cell size of the foam. The particles completely permeate the body and adhere to all of the strands thereof. Thereafter the body is vibrated to free from it particles not directly contacting its strands. The thus coated body is then simultaneously pressed and heated so as to reduce its thickness by a factor of at least two and permanently compress it, thereby forcing all of the particles into good contact with each other for good electrical conductivity.

10 Claims, 7 Drawing Figures

ELASTIC BODY AND METHOD OF MAKING SAME

FIELD OF THE INVENTION

The present invention relates to an elastic body and a method of making same. More particularly this invention concerns a body formed of synthetic-resin foam and treated to be electrically and thermally conductive.

BACKGROUND OF THE INVENTION

It is known to coat a synthetic-resin foam body with electrically conductive particles for use of the body in a filter, as a seal, or as a radiation- or sound-damping element.

The simplest method of making such a body entails mixing the particulate and conductive filler material with the resin before foaming same. The resultant material has a somewhat greater conductivity and considerably greater density than the foam material itself, but still has a conductivity which is only a very small fraction of that of the conductive particulate material mixed with the resin. The main reason for this is that the synthetic resin completely encapsulates the conductive particles so that the flow of electricity or heat between particles must be effected across these virtually nonconductive bridges. At the same time such a standard conductively filled synthetic-resin body is considerably less elastic than the body would be absent such filling, and is in fact greatly more fragile and liable to tearing or permanent deformation when crushed. As the amount of conductive particles is increased in order to maximize the conductivity of the body, the physical properties of the body becomes even worse. A similar process is described in German patent publication No. 1,719,053.

It is also known to form such a body, particularly usable as a seal, with relatively large conductive particles or balls embedded in it. In use the body is compressed greatly so that the relatively incompressible conductive balls are pressed together and effectively crush the resin webs separating them leaving the balls in good electrical contact with one another. The resultant body is relatively conductive, but is ofter unsatisfactory because the damage done to the synthetic-resin structure to achieve this good conductivity has a highly deleterious effect on the physical properties of the body.

It is also known from German patent No. 1,569,416 filed with a claim to the priority of U.S. patent application 365,793 of 7 May 1964 to shake up a synthetic-resin foam body and small conductive particles in a bag, then to fill this bag with a mixture of propane and oxygen. The gas mixture in the bag is then exploded to embed the particles in the body. Such a procedure increases the overall weight of the body by approximately 76%, using a polyurethane foam and graphite particles. The overall specific resistance of such a body is decreased with such a treatment by a factor of between $5 \times 10^3$ and $5 \times 10^4$. Nonetheless the resultant body still has a specific resistance approximately $2 \times 10^{10}$ greater than the resistance of the graphite itself. Thus it can be assumed that in the finished product according to this patent the particles are nonetheless separated sufficiently to account for this considerable resistance.

German patent publication No. 1,704,781 published 27 May 1971 describes another arrangement for coating a synthetic-resin foam body with tiny particles of a thermoplastic synthetic resin, so that the resultant body can easily be heat-sealed or welded to a support. Such a method does not, however, suggest a method of making an improved conductive foam, as the behavior of particles of polyethylene, for instance, and copper can hardly be compared.

OBJECTS OF THE INVENTION

It is therefore an object of the present invention to provide an improved elastic body and method of making same.

Another object is to provide an improved method of impregnating a synthetic-resin foam body with electrically and thermally conductive particles.

Yet another object is to provide such a body which has good electrical and thermal conductivity, along with a relatively low specific weight and considerable elasticity and flexibility.

SUMMARY OF THE INVENTION

These objects are attained according to the present invention by coating strands of a reticulate and generally nonconducting synthetic-resin foam body with a layer of generally conductive particles with a particle size that is a fraction of the cell size of the foam of the body, and then simultaneously compressing and heating the coated body to permanently reduce its overall size and to urge the particles into permanently electrically conducting contact with one another. The result is a microporous elastomer whose specific resistance closely approaches that of the conductive particles used to coat its strands. The body has virtually the same elasticity and flexibility as it has before being coated, compressed, and heated. Furthermore the particles are so well embedded in the resin that even when subjected to considerable compression and elastic deformation these particles do not come loose, but instead remain in excellent electrically conducting contact with one another.

Thus according to the invention a substantially open-celled uncompressed synthetic-resin foam body is coated substantially throughout with conductive particles, without filling the cells of the body. It is then irreversably reduced in size by a combination of pressure and heat in accordance with the principles set forth in German patent publications Nos. 1,504,107 and 1,504,888. Prior to this permanent reduction in overall size any excess particles which are not adhered to or directly in contact with the strands of the foam body are separated from it.

According to this invention the synthetic resin is a polyurethane foam having a density of between 20 kg/m$^3$ and 70 kg/m$^3$ and a cell size of between 4 pores/cm and 40 pores/cm.

SPECIFIC DESCRIPTION

Figure 1:
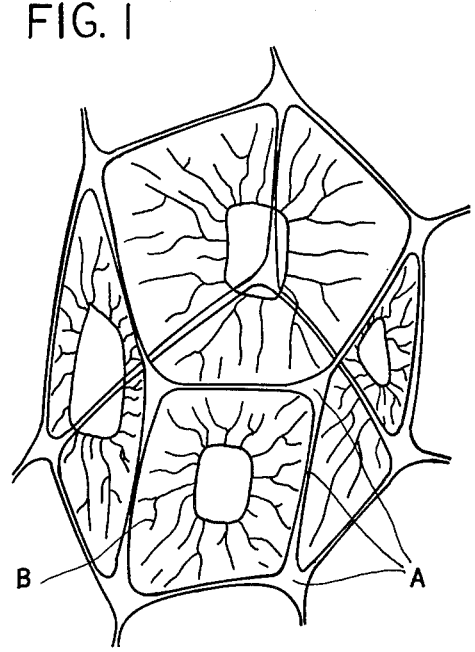
FIGS. 1 and 2 are large-scale views of synthetic-resin foam cell according to this invention.
Figure 2:
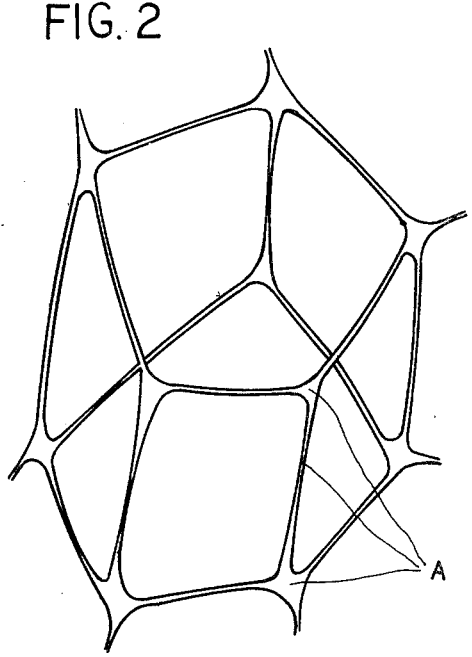
Figure 3:
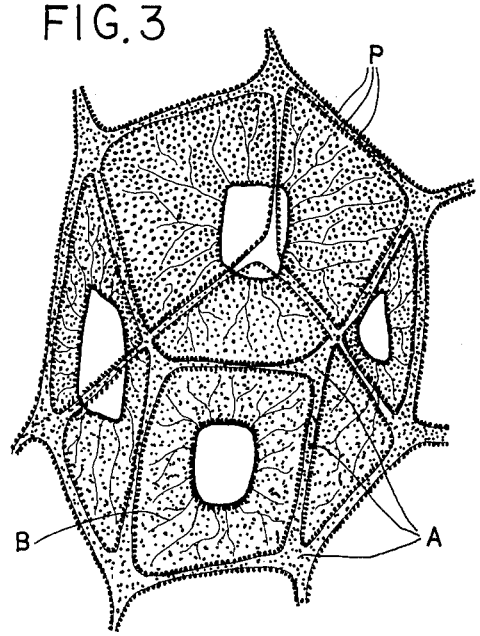
FIGS. 3 and 4 are views showing cells of FIGS. 1 and 2 coated in accordance with this invention.
Figure 4:
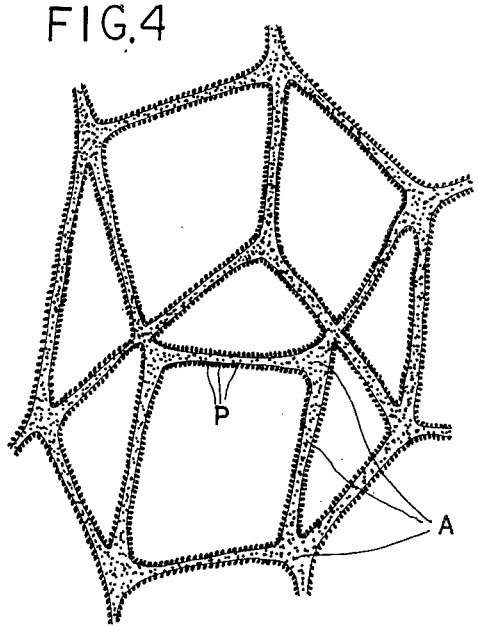

As shown in FIGS. 1 and 2 a synthetic-resin foam body is formed from a multiplicity of cells each in turn formed of strands A and in some cases via membranes B which are not, however, sufficient to close the cells. Such a resin may be of a natural or synthetic origin and may be, or example, polyvinylchloride, an acrylate, an olefin, a styrol, a silicon, a urethane, a viscous resin, a formaldehyde resin, or a natural or synthetic rubber. in accordance with this invention such a resin is coated as shown in FIGS. 3 and 4 with a multiplicity of particles P of conductive material. These particles may, for example, be of copper, silver, aluminum, graphite, silvered copper or of a nonconductive material covered with conductive material such as graphite-covered quartz sand.

It is necessary in accordance with this invention to use a compressible foam whereby the macroporous reticulate structure of the foam is pressed together under elevated temperature so as to reduce the spacing between the strands without congealing the foam into a solid block. In accordance this deformation is effected so as permanently to reduce the size of the body and thereby permanently change the relative positions of the strands so that even if the body is reheated it will not return to its original size.

The use of a thermoplastic resin such as polyvinylchloride is inappropriate since when heated to a temperature below its softening point the deformation is reversible. Heating above its softening point will cause the foam to collapse completely leaving a solid synthetic-resin body rather than a microporous synthetic-resin body. Thus if a thermoplastic loaded with metallic powder is compressed the metal particles will be completely encapsulated, thereby giving a product which will have relatively high resistance and poor physical properties.

When rigid, semirigid, limitedly elastic, or inelastic materials are used the relatively thin strands fracture during compression. Even if extreme care is taken in the selection of press temperature, pressing time, and pressure it is impossible to use such rigid foams in accordance with the invention.

An open-celled soft foam of polyurethane having a density of between 20 kg/m$^3$ and 70 kg/m$^3$ and a pore size of between 15 pores/cm and 30 pores/cm is used in accordance with the invention. Such a material has a cell structure of good geometric uniformity and has the partial membranes shown at B in FIG. 1. These membranes as shown in FIG. 1 can be completely eliminated by reticulation, that is chemically or thermally treating the foam so that the membranes B melt out, dissolve, or join with the strands A.

Figure 7:
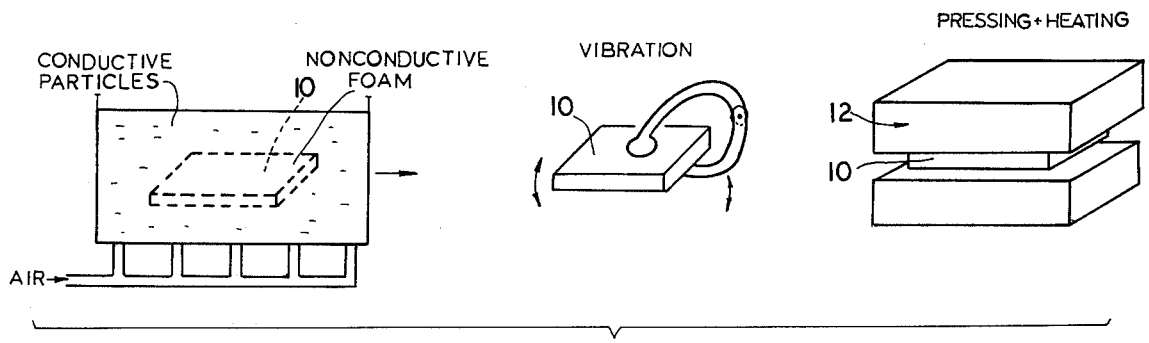
FIG. 7 is a largely diagrammatic view showing the method of making the body according to this invention.

According to this invention the foam is covered with synthetic-resin particles so as to coat all of the strands, and even all of the membranes as shown in FIG. 3 if desired. It is possible to do this by suspending the particles in water and then saturating the foam with the water. This type of procedure has the difficulty that the water frequently reacts with the conductive metallic particles and oxidizes them, and it is necessary to follow this method with a subsequent drying operation. It is also possible to eliminate this oxidation by using a solvent, but this method has the disadvantage that the solvent frequently causes the resin to swell and in any case reqires a subsequent cleaning operation. Thus according to this invention as shown in FIG. 7 a synthetic-resin body 10 is suspended in a fluidized bed of conductive particles 11 to which air is fed. Thus the entire procedure is effected without the use of a liquid. The entire bed is vibrated at a high frequency to insure that the power completely permeates and fills the body 10.

Figure 5:
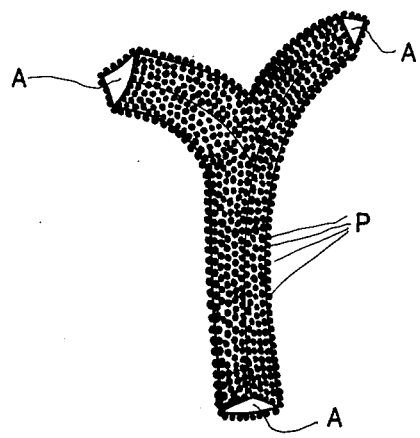
FIG. 5 is a view of a portion of a foam body prior to compression thereof.

Thereafter as also shown in FIG. 7 the body 10 is vibrated at high speed so as to shake from it the excess particles that fill its cells. This leaves the boy as shown in FIGS. 4 and 5 with a layer of particles P on all of the strands A. These particles P lie next to each other but are in such loose contact with each other that they do not form a good conductive path.

Table I given below shows five various trials with metal powder, here copper, and indicates how each sample can only accept a certain amount of the powder no matter how long it is treated:

Table I

| Trial | Foam Weight | Filled Foam Weight | % Filling |
|---|---|---|---|
| 1 | 14 | 72.0 | 80.6 |
| 2 | 14 | 72.5 | 80.7 |
| 3 | 14 | 75.5 | 81.5 |
| 4 | 14 | 73.5 | 81.0 |
| 5 | 14 | 76.0 | 81.6 |

No matter how long the foam is vibrated it has been found that a certain quantity of the powder will remain stuck to it, and the balance will separate very readily and very quickly. When seen under an electron microscope the strands A have a rough surface, which probably accounts for this stickiness.

Table II below shows the results of trials with dendritic copper powder of various types which are broken down into percents by particle size.

Table II

| Powder Type | Very Fine | Fine | Coarse | Very Coarse |
|---|---|---|---|---|
| Particle Size | Screen Analysis in % | | | |
| 0.315 | | | | 30 |
| 0.210 | | | | 50 |
| 0.080 | | | 40 | 20 |
| 0.040 | 10 | 20 | 30 | — |
| 0.040 | 90 | 80 | 30 | — |
| Filling % | 81 | 69 | 33 | 13 |

The above-given table shows that only particles under 0.06 mm screen size are retained. The ability of the resin to hold approximately 13% of the very coarse particles is due mainly to the fact that these particles get caught in the cells, not because they stick to the strands themselves. The specific weight alone of the powder does not control exclusively, but is influenced by the shape of the particles--dendritic, round, or regularly spread--as well as the size, shape, and the surface characteristics of the strands of the resin.

After vibrating the excess powder free from the plate 10 as further shown in FIG. 5 the plate 10 is simultaneously pressed and heated in a press 12. The temperature of this press 12 lies between 150° C. and 230° C. and the pressure exerted on the plate 10 is between 0.5 kp/cm$^2$ and 100 kp/cm$^2$. The plate 10 is held in the press 12 for a time between 10 sec and 30 sec. This operation compresses the reticulate structure of the foam so that the particles lie closely one against the other, while at the same time strands A are not melted together but merely compressed somewhat.

Figure 6:
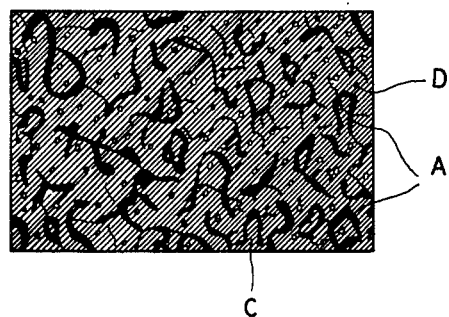
FIG. 6 is a large-scale sectional view through a finished body according to this invention.

The result is a polyurethane block impregnated with metal powder wherein the elastic polymers are pressed together. The surface of such a body is very smooth, with the filling powder being hardly in evidence. Fig. 6 shows the pressed together strands A and regions C wherein the particles are tightly stretched together, only leaving micropores D. The pressing operation is halted before the synthetic resin of the block 10 molds together into a thick homogenous block and before the fine strands lose their good tensile strength and elasticity. If the heat and pressure is excessive and the material is allowed to flow together the result is a relatively inflexible and easily torn body.

The pressing operation normally reduces the overall size or volume of the plate 10 by a factor of between 2:1 and 30:1, that is measuring the original thickness to the final thickness. Such a procedure considerably densifies the block and ensures that any nonuniformity in the original foam or distribution of filling particles therein is compensated for.

EXAMPLE

A plate 10 mm thick and having a surface area of 500 cm$^2$ weighs 14 g and is made of open-cell soft polyurethane foam. This foam is formed from polyester and has a density at ambient temperature of 28 kg/m$^3$ and a pore size of 23 pores/cm. It is loaded as shown in FIG. 7 into a flat holder with 150 g of dendritic copper powder with a particle size of 90% below 0.04 mm and 10% between 0.04 and 0.08 mm. This copper powder is spread over the polyurethane plate and a mechanical vibrator is used at a frequency of approximately 24,000 hz to completely permeate the body with the powder.

After some three minutes of vibration the foam has picked up 72 g of the copper powder, so as to have a filler percentage of 80%. Microscopic examination shows that all of the strands of the resin are covered with the copper powder.

Thereafter thus loaded plates are pressed at a temperature of 200° C. for 10 seconds in accordance with Table III below.

Table III

| Pressure kp/cm$^2$ | Thickness mm | Spec. Weight p/cm$^3$ | Spec. Resistance Ohm mm$^2$/m |
| --- | --- | --- | --- |
| 4.0 | 0.95 | 1.51 | — |
| 10.0 | 0.80 | 1.81 | 180 |
| 20.0 | 0.65 | 2.20 | 40 |
| 40.0 | 0.63 | 2.30 | 18 |
| 60.0 | 0.60 | 2.54 | 10 |

Thus it is apparent that only with a pressure of above 20 kg/cm$^2$ does one obtain a microporous polyurethane elastomer with good conductivity, low specific gravity, and excellent flexibility.

The use of polyester or polyether foams can be envisaged in order to obtain different properties. Polyether foam has an excellent resistance to hydrolysis where polyester foam resists certain solvents very well.

It is of course within the scope of this invention to permeate only a portion of the body with the powder, to obtain an only partially conductive end product. Furthermore the end product can be treated with various synthetic-resin solutions or dispersions subsequently.

The product can be used for seals, as well as for sound and heat-conducting applications. In addition the product is excellent for use in radiation and sound damping.

I claim:

1. A method of making a conductive and compressible body, said method comprising the steps of sequentially:
   coating the strands of a reticulate and generally non-conducting synthetic-resin foam body with a layer of generally conductive particles of a particle size greatly smaller than the cell size of the foam of said body; and
   simultaneously compressing and heating the coated body to permanently reduce the overall size thereof and to urge said particles into permanent electrically conducting contact with one another.

2. The method defined in claim 1 wherein said particles are metallic.

3. The method defined in claim 1 wherein said particles are coated on said foam body by applying said particles to and through said foam body and thereafter separating from said foam body particles not directly in contact therewith.

4. The method defined in claim 3 wherein said particles are applied to said body by orming forming fluidized bed of said particles and submerging said foam body in said fluidized bed.

5. The method defined in claim 4 wherein particles are separated from said foam body by vibrating same.

6. The method defined in claim 1 wherein the coated body is compressed in a press.

7. The method defined in claim 1 wherein said foam body has prior to compression a density of between 20 kg/m$^3$ and 70 kg/m$^3$ and cell size of between 4 pores/cm and 40 pores/cm.

8. The method defined in claim 1 wherein said foam body is a urethane foam.

9. A conductive and elastomeric body comprising a compressed reticulate synthetic-resin foam having a multiplicity of interconnected strands and a coating of conductive particles in good electrical contact with each other substantially completely covering and embedded in said strands.

10. The body defined in claim 9 wherein said foam is a reticulate urethane and said particles are metallic.

* * * * *